INVENTOR.
ADOLF FRÖHLICH
BY J. William Freeman
ATTORNEY

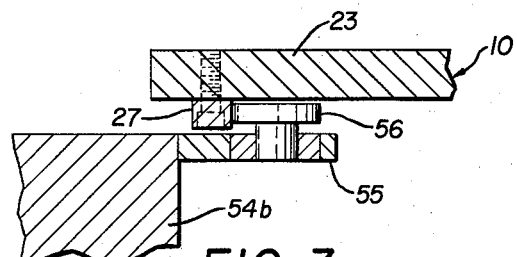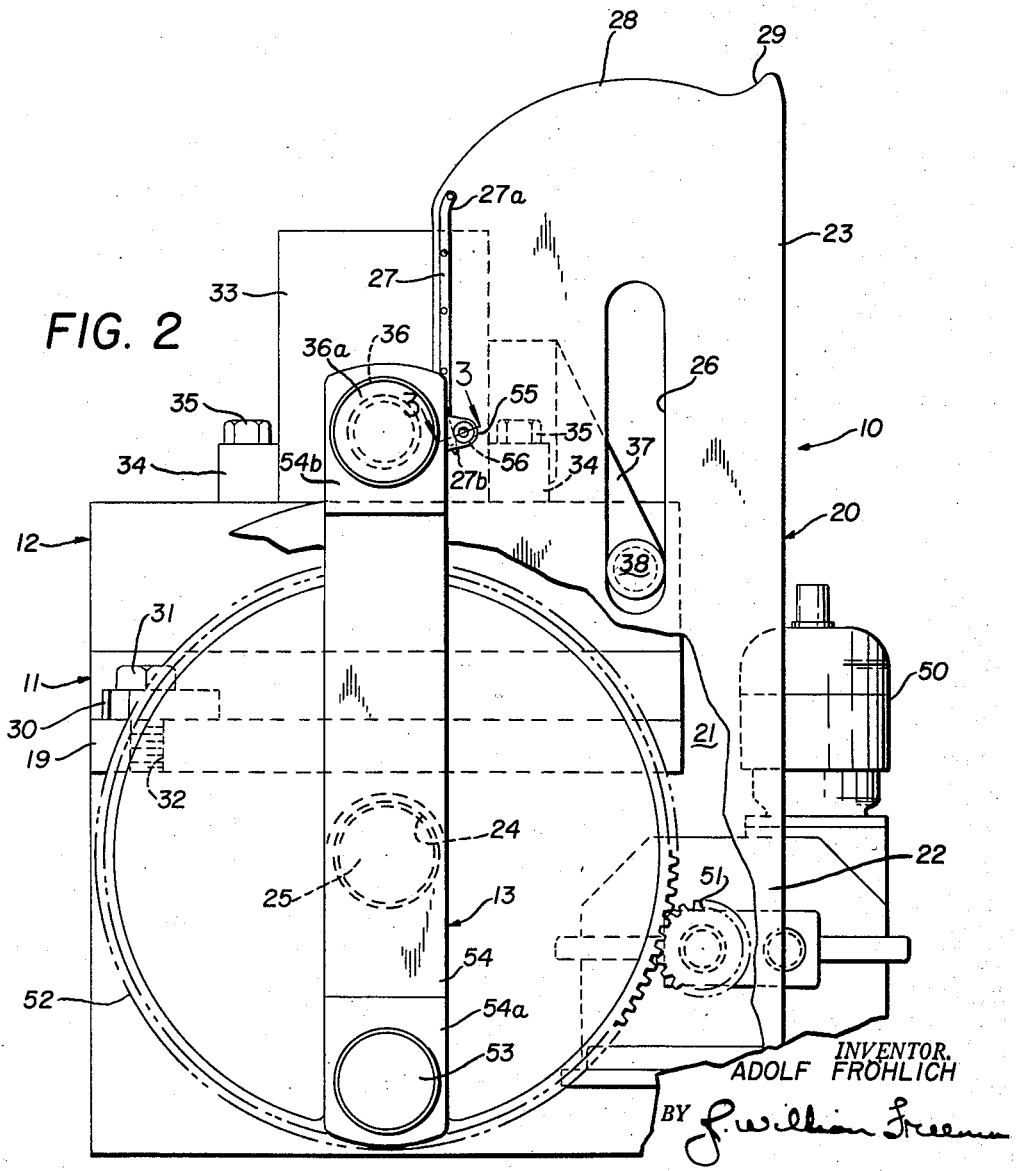

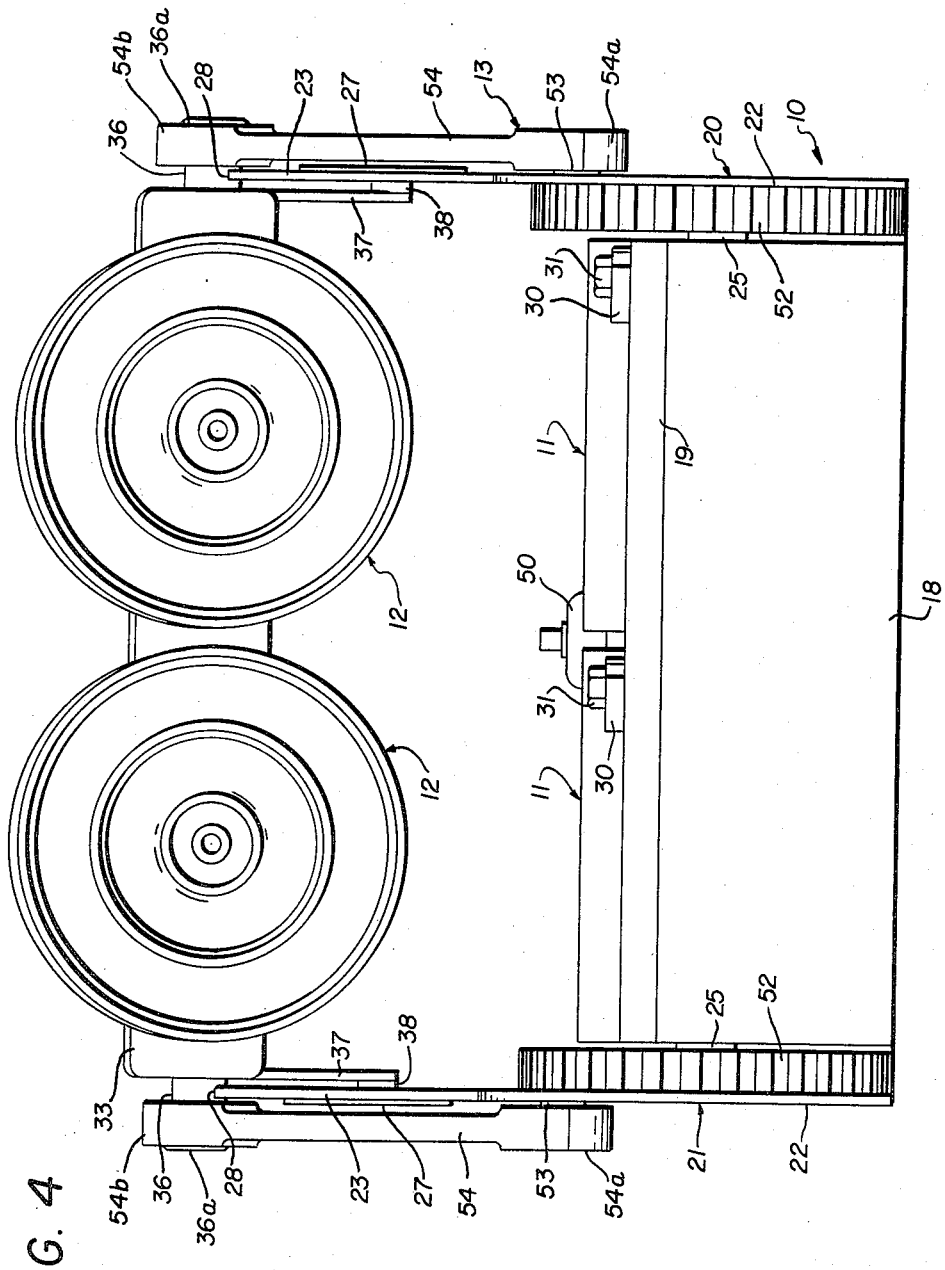

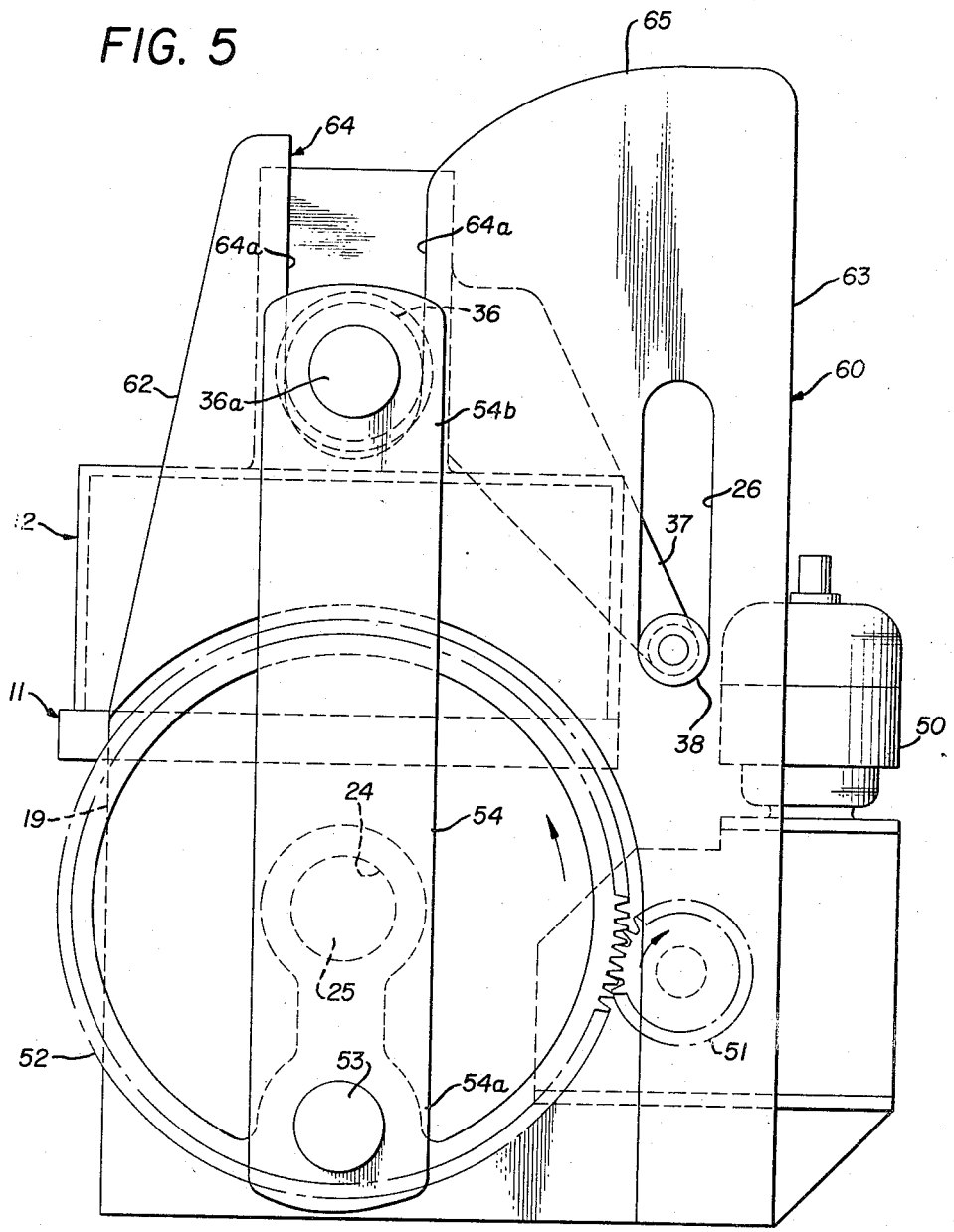

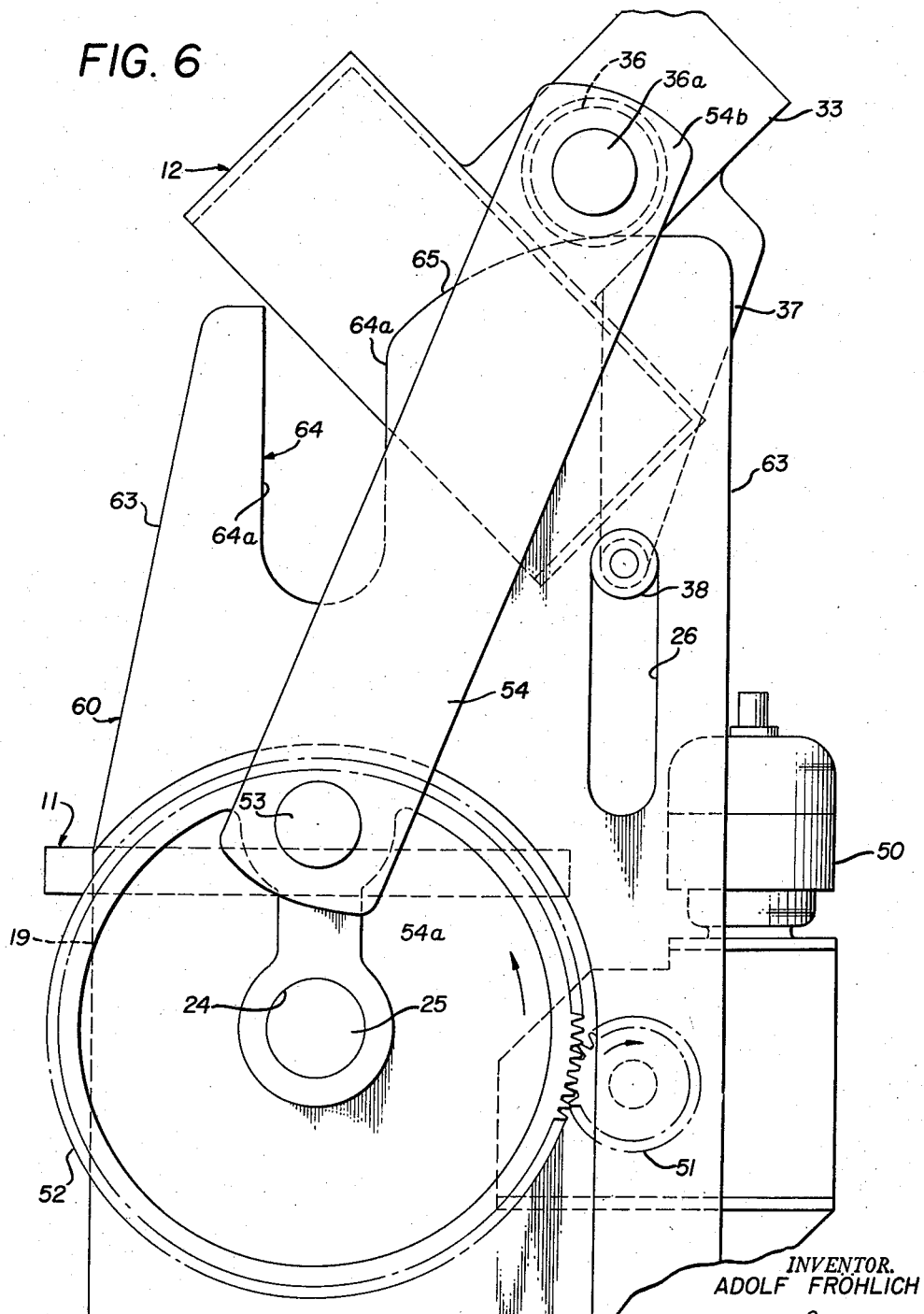

United States Patent Office 2,904,831
Patented Sept. 22, 1959

2,904,831
VULCANIZING PRESS

Adolf Fröhlich, Hannover, Germany, assignor to The Cleveland Trust Company, Cleveland, Ohio, as trustee Application June 23, 1955, Serial No. 517,609

4 Claims. (Cl. 18—17)

This invention relates to vulcanizing presses, and in particular, has reference to improved types of actuating linkages for moving the respective complemental mold sections of a vulcanizing press.

As is well known in the prior art, vulcanizing presses have long been provided wherein a pair of complemental upper and lower mold sections have been moved relatively of each other to permit reception therebetween of an uncured tire carcass that is subsequently vulcanized between the closed mold sections by the use of a vulcanizing medium supplied interiorly of the closed press.

While several forms and types of actuating linkages have been provided in the past for effectuating such movement between the complemental mold sections, the same have generally been complex in design and have accordingly been bulky in nature, resulting in relatively high cost for such presses.

It has been discovered that reduction in weight, and simplification of design can be achieved in the above type of vulcanizing press by utilizing a simplified type of linkage in conjunction with integral side supports that have incorporated therein cooperating cam surfaces that coact with said linkage to move the respective mold sections towards each other in the desired "straight line" type approach. It has been further found that the use of the above type of simplified actuating linkage can be utilized to position one mold section at approximately right angles with respect to the remaining mold section, when the mold sections are in the open position.

It has been further discovered that the use of such a simplified actuating linkage in conjunction with integral side supports having cooperating cam surfaces provided therein permits the use of the same basic linkage structure in combination with a plurality of different mold sections, with the result, for example, that either three passenger tire molds or two truck tire molds can be interchanged on the same basic vulcanizing press without modification of the actuating linkage thereof.

Accordingly, it is one object of this invention to provide a vulcanizing press having an improved actuating linkage for the mold sections, wherein a vulcanizing press characterized by a straight line approach, is provided.

It is a further object of this invention to provide a vulcanizing press of the character described, and characterized by the fact that one mold section thereof can be swung to approximately right angles with respect to the other remaining mold section thereof, upon opening of the press to thus facilitate easy cleaning of said mold section.

It is a still further object of this invention to provide a vulcanizing press, the support and actuating linkage of which are characterized by the fact that the same can interchangeably receive a plurality of different size mold sections, to thus facilitate interchanging of mold sections without modification of the size of the vulcanizing press.

These and other objects of the invention will become more apparent upon a reading of the following brief specification, considered and interpreted in the light of the accompanying drawings.

Of the drawings:

Figure 2 is a view similar to Figure 1, but illustrating the preferred embodiment of the improved vulcanizing press in the closed position thereof.

Figure 3 is a sectional view taken on the lines 3—3 of Figure 2.

Figure 4 is a front elevation taken on the lines 4—4 of Figure 1.

Figure 5 is a side elevational view, partly broken away and in section and illustrating a modified form of the invention.

Figure 6 is a view similar to Figure 4, but illustrating the modified form of the invention in the open position thereof.

Figure 1:
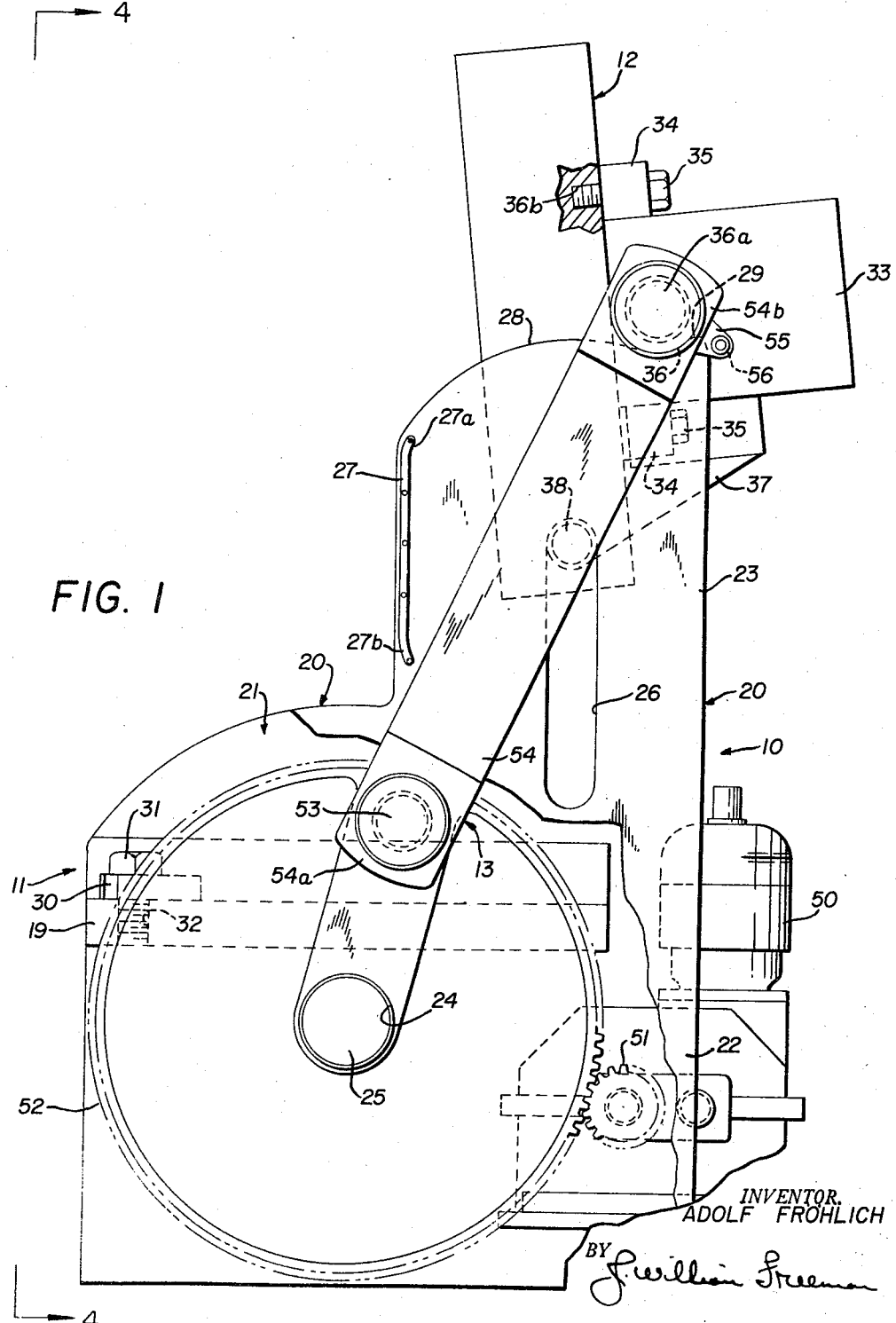
Figure 1 is a side elevation, partly broken away and in section, and illustrating the preferred embodiment of the improved vulcanizing press in the open position thereof.

Referring now to the drawings, and in particular, to the preferred embodiment of the invention illustrated in Figures 1, 2, 3 and 4 thereof, the improved vulcanizing press is shown as including a stationary frame 10, a lower mold section 11 fixed to the frame 10, and an upper mold section 12 that is relatively movable with respect to both the lower mold section 11 and the frame 10 upon operation of actuating means 13, in a manner to be described.

In order that the function and structure of the above listed component parts might be more fully understood, the same will be separately described.

Description of the stationary frame

As best shown in the drawings, the frame 10 is, in essence, defined by a pair of vertically extending, spaced end plates 20, 21 that are tied together at the base portions thereof by the usual horizontal frame members 18, 18 (see Figure 4) so as to constitute a support for the remaining component parts of the vulcanizing press. Additional rigidity in this regard is provided for by provision of the usual bed plate 19 upon which the lower mold sections 11, 11 are secured in known manner; it being understood that the longitudinal end portions of said bed plate are respectively fixed to the end plates 20, 21 as by welding, for example.

For the purpose of coaction with the supporting framework for the upper mold sections 12, 12, each end plate 20, 21 is shown as being of substantially the same configuration, wherein a lower base portion 22 of substantially square outline, and a rectangular upper portion 23 is presented; the arrangement being such that the lower portion 22 serves as a housing for the driving mechanism per se, while the upper portion 23 in each case serves as a guide for controlling movement of the upper mold 12, in a manner to be described.

To this end, the lower body portion 22 of each end plate 20 and 21 is shown as including apertures 24, 24, within which may be journaled a shaft 25 employed to mount a drive ring for effectuating relative movement between the mold sections, as will be presently described. By like token, the upper portions 23, 23 of each end plate 20, 21 include aligned, vertically extending slots 26, 26, as well as guide cams 27, 27 that are provided on the front marginal edges of the upper portion 23 for the purpose of effectuating controlled contact with the upper mold section 12. The arrangement and configuration of each guide strip 27, 27 is such that the same has an arcuate contour 27a at the upper end, and a similarly shaped contour 27b provided at the lower end thereof. For the sake of clarity, each guide cam 27, 27 has been indicated as being presented on the outer face of the respective end plates 20, 21, but it is to be understood that these guide cams 27, 27 could be provided on the internal faces of said end plates with equal result. By like token, as best shown in Figure 2 of the drawings, the top marginal edge portion of the upper portion 23 is contoured as at 28, so as to define a guide track across which the carrying frame for the upper mold sections 12, 12 will move upon energization of the actuating means 13. In order that the upper mold sections 12, 12 might be moved into the position of approximately right angles with the lowermost section 11, as shown in Figure 1 of the drawings, the contoured surface 28 is shown as terminating in a reverse contour as at 29; this latter surface (surface 29) serving as an end point of movement for the mold sections 12, 12.

*Description of the upper and lower mold sections*

With the exception of certain to be described structural characteristics that facilitate mounting of the upper and lower mold sections with respect to the frame 10, the construction of the lower mold sections 11, 11 and the upper mold sections 12, 12 are of conventional type, wherein the usual design-imparting mold surface, as well as a surrounding steam or vulcanizing chamber are provided in these respective mold sections for the purpose of providing a closed annular chamber for reception therein of the shaped pneumatic tire.

Accordingly, each of the lower mold sections 11, 11 are shown including ears 30, 30 through which may be passed bolts 31, 31 that are capable of reception in tapped apertures 32, 32 of bed plate 19.

While the lower mold sections 11, 11 are mounted in fixed relationship with respect to the end plates 20, 21 as just described, the upper mold sections 12, 12 are illustrated as being carried on a head casting 33; the arrangement being such that the ears 34, 34 of head casting 33 accommodate bolts or lugs 35, 35 that are in turn received in tapped apertures 36b, 36b of mold sections 12, 12. In order that mold sections 12, 12 may move as a unit, relatively of the frame 10, the axial end portions of the head casting 33 include rollers 36, 36 that are designed to be received on the contoured surface 28 of the upper body portion 23. In this manner, the movement of the individual mold sections 12, 12 will be controlled as a result of the movement of the rollers 36, 36 across the contoured section 28, with the extent of such contoured movement being limited by the reverse contoured section 29.

By like token, to effectuate the tipping or cocking of the upper mold sections 12, 12 to facilitate cleaning thereof, the head casting 33 is shown provided with spaced flanges 37, 37 that have the projecting ends thereof provided with rollers 38, 38 designed for reception in aligned vertical slots 26, 26 of end plates 20 and 21. In this manner, as the rollers 38, 38 move upwardly from the position of Figure 2 towards the position of Figure 3, the vertical height of the rear edge of the head casting 33 will be controlled by the position of the roller 38 in the slots 26, 26 and further movement of the head casting 33 rearwardly of the contoured surface 28 will result in tipping of the mold sections 12, 12 to the position of Figure 1.

It will be noted in each case that the mounting of the respective mold sections is such that a plurality of tapped apertures 32, 32 and ears 34, 34 can be respectively provided transversely of the bed plate 10 and head casting 33. In this manner, the same press structure can receive various size molds, with the result, for example, that two truck molds or three passenger molds can be positioned, as desired, between the end plates 20, 21.

It is also to be understood that the supply lines and controls for these mold sections are provided in known manner.

*Description of the actuating mechanism*

The actuating mechanism 13 that effectuates the relative movement between the upper mold sections 12, 12 and the relatively fixed lower mold sections 11, 11 is shown energized by motor 50 that drives in known manner, a pinion 51; the arrangement being such that drive pinion 51 meshes with a bull ring 52 that is journaled about the shaft 25 in known manner. The bull ring 52 also includes a radially spaced pin 53 that serves as a point of pivotal mounting for one end 54a of a link arm 54, the opposed free end 54b of which is journaled about a shaft extension 36a that extends axially of the head casting 33 and roller 36 across the contoured surface 28 from the position of Figure 1 towards the position of Figure 2, to thus effectuate closing of the mold section.

To the end of preventing the link arm 54 from tipping to the left of Figure 2 of the drawings, the upper end 54b of link arm 54 includes a flange 55 that carries a spaced roller 56 that is designed for engagement with the guide track 27 so as to prevent counter-clockwise movement of the link arm 54 when the same is in the position of Figure 2 of the drawings.

In describing the actuating mechanism 13, reference has been made, for the sake of clarity, to the description of the actuating means operating in conjunction with one end plate 20 only. It is to be understood, as shown in Figure 4 of the drawings, that a similar actuating means may be utilized adjacent the remaining end plate 21, with the drive for such mechanism being off the other end of motor 50. Thus, the head casting 33, which has rollers 36, 36 at the opposed longitudinal ends thereof, may have shaft extensions 36a, 36a driven by the movement of link arms 54, 54 that are moved by a common motor 50.

*Operation of the vulcanizing press*

In use or operation of the improved vulcanizing press, it will be first assumed that the component parts are positioned as shown in Figure 1 of the drawings, with the upper mold sections 12, 12 being cocked at approximately right angles to the lower mold sections 11, 11 that are fixed with respect to the end plates 20, 21, as a result of attachment to bed plate 19.

At this time, the motor 50 may be energized to cause the bull ring 52, through drive pinion 51, to move counter-clockwise of Figure 1 of the drawings, with the pin 53 accordingly rotating so as to move downwardly and to the left of Figure 1 about the point of rotation defined by the shaft 25. As such movement continues, the rollers 36, 36, being in contact with the contoured surface 28, will follow the contour of said surface and will gradually move downwardly and to the left of Figure 1 across the contoured surface 28. As the rollers 36, 36 approach a point approximately midway between the positions of Figure 1 and Figure 2 of the drawings, it is apparent that the rollers 56, 56 will engage the back side of the surfaces 27a, 27a of the cam guides 27, 27, and further movement of the link arm 54 will result in the upper mold sections 12, 12 being moved to a substantially horizontal position with respect to the mold sections 11, 11.

After such contact between the rollers 56, 56 and the cam guides 27, 27, it is apparent that the upper mold sections 12, 12 will approach the lower mold sections 11, 11 in straight line relationship with each other as a result of the rollers 56, 56 following the vertical path of the cam guides 27, 27. When the position of Figure 2 has been reached, the pin 53 will have moved approximately 180° to a lower dead center position; and at this time, the upper and lower mold sections will be fully engaged and vulcanizing can be commenced by the introduction of fluid medium interiorly of the closed mold sections, in known manner.

When it is desired to open the mold sections after vulcanization has been completed, for example, it is apparent that the motor 50 may be energized in the opposite direction to cause the bull ring 52, acting through pinion 51, to move clockwise of Figure 2 of the drawings; and in this manner, the pin 53 will move upwardly and to the right of Figure 2 of the drawings towards the position of Figure 1. During such initial movement the positioning of the upper mold sections 12, 12 will be controlled as a result of the contact between the rollers 56, 56 and the cam guides 27, 27, and upon further upward separating movement of the mold sections 12, 12 as a result of continued clockwise rotational movement of the bull ring 52, it is apparent that the rollers 36, 36 will come into contact with the contoured surface 28 and will roll thereon until the same reaches the recessed point thereof, as defined by the reversed contour 29; at which time further movement will be ceased.

At this time, it will be noted that the upper mold sections 12, 12 will have been cocked or pivoted to the position of Figure 1 as a result of the rollers 38, 38 reaching the uppermost vertical limit of the slots 26, 26. In this cocked position, the interior design-imparting surfaces (not shown) may be easily cleaned by the operator of the vulcanizing press, and when such cleaning has been accomplished, a new tire may be inserted in known manner, and the above operation repeated to effectuate vulcanization by the repetition of the above cycle of operation.

It will be seen from the preceding that there has been provided a new and improved type of vulcanizing press, wherein a simplified type of construction has resulted from the incorporation of an integral part of the actuating mechanism in the structural support members per se. Specifically, by incorporating the contoured surfaces and guide slots on the end plates, it has been shown how the number of component parts have been materially reduced to thus present a vulcanizing press of simplified design and construction.

The modified form of the invention illustrated in Figures 5 and 6 of the drawings is similar in the great majority of respects to said previously illustrated and described Figures 1, 2, 3 and 4 of the drawings, with the single exception that the contour of the end plates is somewhat modified in its outline. Accordingly, where indicated, like numerals designate like parts.

Turning now to Figures 5 and 6 of the drawings, will be seen that each end plate 60 and 61 is of substantially similar rectangular configuration, wherein front marginal edge surfaces 62, 62 and rear, vertically extending marginal edge surfaces 63, 63 are provided. Each end plate 60 and 61 further includes a vertical slot 64 that opens to the top marginal edge portion thereof so that the wall portions 64a, 64a of each slot 64 defines a contoured top marginal surface 65 that terminates at the rear marginal edge portion 63.

In order that more efficient movement of the rollers 36, 36 might be achieved in this modified form of the invention, the contoured outline of edge surfaces 65, 65 is such that the same defines a radius about the center line of the rollers 38, 38 when the same are positioned in the uppermost vertical location of the slots 26, 26. In this manner, when the flange 40 and the rollers 38, 38 have been moved to their vertical extent within the slots 26, 26 as previously described in connection with Figures 1 through 4 of the drawings, the rollers 36, 36 will, in effect, pivot about the uppermost portion of the slots 26, 26 as a result of the surfaces 65, 65 being radiused about this point.

In use or operation of this modified form of the invention, counter-clockwise movement of bull ring 52 will operate to move the press from the closed position of Figure 4 to the open position of Figure 5 as before. The rollers 36, 36, when so moving, will first move upwardly within the confines of the vertically extending slot 64, and at such time as the upper limit of travel of rollers 38, 38 within slots 26, 26 has been reached, further counter-clockwise rotational movement of the bull ring 52 will result in the rollers 36, 36 rotating on the surfaces 65, 65, about a pivot point defined by the uppermost position of the rollers 38, 38 in slots 26, 26. The effect of such rotational movement about the radius contours 65, 65 will be to tip or cock the mold, and it is believed apparent in this regard, that the back portion of the surfaces 65, 65 could be relieved adjacent their points of juncture with the marginal edge portions 63, 63 to increase the degree of cocking attained.

In the preceding paragraphs the bull ring 52 has been described as being reversed in its directional movement to respectively open and close the mold sections. It is to be understood however, that a continuous rotational movement of the bull ring 52 could be provided to effectuate opening and closing, by modifying the parts in known manner.

The preceding specification has included a complete and full description of the component parts forming the basis of the invention. In certain cases, known accessory equipment, such as vulcanizing supply lines and the controls therefor, have not been included in detail for the sake of clarity. It is to be understood that the use of such standard equipment in combination, falls within the purview of this invention.

It accordingly follows that modifications of the invention may be resorted to without departing from the spirit thereof or the scope of the appended claims.

What is claimed is:

1. A vulcanizing press of the character described, comprising; a base portion; a lower mold section fixed to said base portion; a pair of upright opposed end plates fixed to opposed ends of said base and said lower mold section and each including substantially vertical parallel front and rear edge surfaces that are interconnected by a top surface; a drive wheel carried by said base and having an eccentric point disposed exteriorly of each said end plate; a link arm having one end rotatably journalled about said eccentric point; a complemental, relatively movable upper mold section having shaft members projecting from opposed ends thereof for rotatable journalling within the remaining ends of said link members; a first series of roller members disposed around said projecting shafts in concentricity therewith and being receivable against the front and top surfaces of said side plates; each said plate having a vertically extending guideway provided therein at a point substantially intermediate said front and rear edge surfaces in parallelism therewith; a second set of rollers carried by said upper mold section at a rearmost portion thereof and being received within said guideways of said end plates; a guiderail disposed rearwardly of said front edge in substantial parallelism therewith and having front and rear edge surfaces; and a third set of rollers carried by one end of said link members and disposed adjacent said first rollers said rollers engaging and moving across said rear face of said guiderail upon movement of said first rollers across said front edge of said side plates; whereby said guide rails retain said first rollers against said front edges of said end plates during opening and closing of said press.

2. A vulcanizing press of the character described, comprising; a base portion; a lower mold section fixed to said base portion; a pair of upright opposed end plates fixed to opposed ends of said base and said lower mold section and each including substantially vertical parallel front and rear edge surfaces that are interconnected by a top surface; a drive wheel carried by said base and having an eccentric point disposed exteriorly of each said end plate; a link arm having one end rotatably journalled about said eccentric point; a complemental, relatively movable upper mold section having shaft members projecting from opposed ends thereof for rotatable journalling within the remaining ends of said link members; a first series of roller members disposed around said projecting shafts and being receivable against the front and top surfaces of said side plates; each said plate having a vertically extending guideway provided therein at a point substantially intermediate said front and rear edge surfaces in parallelism therewith; a second set of rollers carried by said upper mold section at a rearmost portion thereof and being received within said guideways of said end plates; a guiderail disposed rearwardly of said front edge in substantial parallelism therewith and having front and rear edge surfaces; and a third set of rollers disposed adjacent said first rollers said rollers engaging and moving across said rear face of said guiderail upon movement of said first rollers across said front edge of said side plates; whereby said guide rails retain said first rollers against said front edges of said end plates during opening and closing of said press.

3. The device of claim 2 further characterized by the fact that said top surface of each said end plate is defined by a convex edge surface that extends throughout a substantial portion of its length.

4. The device of claim 3 further characterized by the fact that said convex edge surface terminates in a concave edge surface adjacent the rearmost edge surface of each said end plate.

References Cited in the file of this patent

UNITED STATES PATENTS

| | | |
|---|---|---|
| 2,296,800 | Soderquist | Sept. 22, 1942 |
| 2,324,818 | Brundage | July 20, 1943 |
| 2,355,846 | Brundage | Aug. 15, 1944 |
| 2,495,663 | Soderquist | Jan. 24, 1950 |
| 2,808,618 | Soderquist | Oct. 8, 1957 |